United States Patent
Balia et al.

(10) Patent No.: US 8,886,174 B2
(45) Date of Patent: Nov. 11, 2014

(54) METHOD AND SYSTEM FOR SERVICE PROVIDER AWARENESS

(75) Inventors: Hinal K. Balia, Germantown, MD (US); Euclid Brooks, Laurel, MD (US); James H. Yoo, Clarksville, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1032 days.

(21) Appl. No.: 11/554,723

(22) Filed: Oct. 31, 2006

(65) Prior Publication Data

US 2008/0102805 A1    May 1, 2008

(51) Int. Cl.
*H04M 3/00* (2006.01)
*H04M 3/493* (2006.01)
*H04M 1/725* (2006.01)

(52) U.S. Cl.
CPC .......... *H04M 3/493* (2013.01); *H04M 2207/18* (2013.01); *H04M 1/72519* (2013.01); *H04M 2203/2011* (2013.01)

USPC ......... 455/418; 455/415; 455/435.2; 455/466

(58) Field of Classification Search
None
See application file for complete search history.

(56) References Cited

U.S. PATENT DOCUMENTS

| 2005/0250483 A1* | 11/2005 | Malik ........................... 455/415 |
| 2007/0015507 A1* | 1/2007 | Petronelli .................. 455/435.2 |
| 2007/0111714 A1* | 5/2007 | Edwards ....................... 455/415 |
| 2007/0249379 A1* | 10/2007 | Bantukul ..................... 455/466 |

* cited by examiner

*Primary Examiner* — Gerald Johnson (57) ABSTRACT

Embodiments of the present disclosure are directed to a method and system for service provider awareness by receiving information associated with a potential call between an originator and an intended recipient, determining whether the potential call is in-network or out-of-network, notifying at least one of the originator or the intended recipient based on the determination, creating a message based on whether the potential call is in-network or out-of-network, encapsulating the message, and transmitting the message to a mobile device.

26 Claims, 6 Drawing Sheets

METHOD AND SYSTEM FOR SERVICE PROVIDER AWARENESS

BACKGROUND INFORMATION

Wireless phones and other mobile devices are very popular modes of communication for most people. Calling plans for these phones and devices are typically based on a monthly payment schedule such that a flat-fee rate covers all calls for a predetermined number of minutes. Night and weekend calls may be included without charge. However, most service providers charge a premium rate for every minute over the monthly allotted minutes in a calling plan. As a result, when a user runs out of minutes and/or repeatedly goes over the allotted minutes in his or her plan, the user may end up with very high bills.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

A system and process of a preferred embodiment of the disclosure provides a service provider identification feature to subscribers within a mobile communications network. A subscriber, who has an account with a service provider, may ascertain whether a caller is calling from the same service provider (in-network) or from a different service provider (out-of-network). Also, a subscriber, who is the caller, may have the ability to identify whether the destination party is in-network or out-of-network. Since in-network calls (unlike out-of-network calls) usually do not incur additional fees, a subscriber having this feature may better manage his or her monthly allotted minutes. For example, if the subscriber has a habit of running over his or her monthly allotted minutes, which may lead to excessive overage charges on his or her account, the subscriber may be tempted to upgrade to a plan that provides more minutes. However, this upgrade option may result in paying a higher monthly fee and give him or her too many unneeded minutes. If one of the reasons that the subscriber goes over the monthly allotted minutes is because he or she calls or receives calls from out-of-network callers, a service provider awareness feature may assist the subscriber in being selective with those out-of-service calls. In this example, the subscriber may actually save more money from a provider identification service than from upgrading to another plan. Thus, service provider awareness, which may be similar to caller ID, may be an optional add-on feature to identify whether a caller or a called party is in-network or out-of-network. A service provider may charge its subscribers for its use or it may be provided as a free or packaged service to attract more subscribers.

Figure 1:
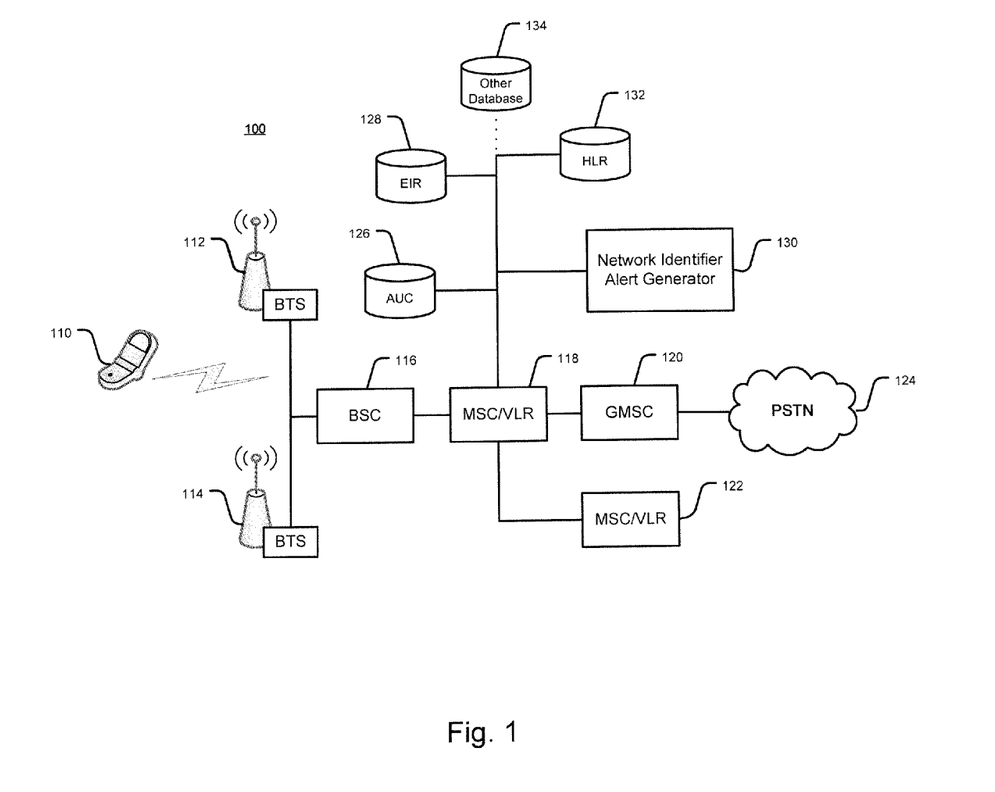
FIG. 1 is an exemplary illustration of wireless network infrastructure, according to an embodiment of the disclosure.

FIG. 1 is an exemplary wireless network infrastructure for a service provider, according to an embodiment of the present invention. FIG. 1 depicts a system 100 for supporting wireless communications, in particular, a wireless network for providing a service provider awareness/identification feature. As illustrated, a mobile device 110 may be coupled to one or more Base Transceiving Stations (BTS) 112, 114. Each Base Transceiving Station 112, 114 may be monitored and controlled by a Base Station Controller (BSC) 116. A Mobile Switching Center (MSC) 118 may control the Base Station Controller 116. In one embodiment, an additional Mobile Switching Center 122 may be provided. In another embodiment, Mobile Switching Center 118 and/or 122 may include one or more Visitor Location Registers (VLR). An Authentication Center (AUC) 126, an Equipment Identity Register (EIC) 128, a Home Location Register (HLR) 132, and other database 134 may connect to the Mobile Switching Center/Visitor Location Register 118. Mobile Switching Center/Visitor Location Register 118 may interface with a Public Switched Telephone Network (PSTN) 124 through a Gateway Mobile Switching Center (GMSC) 120. Network Identifier Alert Generator 130 may also be connected to Mobile Switching Center/Visitor Location Register 118 and the various databases 126, 128, 132, 134 to identify calls as in-network or out-of-network.

Mobile device 110 may include a wireless device with which a subscriber may interface with a network system 100. Such a device may include a wireless phone, a Personal Digital Assistant (PDA), a computer (e.g., a laptop notebook), a gaming device, or other similar device. Other various embodiments may also be considered.

Base Transceiving Stations 112, 114 may hold radio transceivers that define a cell and may coordinate radio-link protocols with a mobile device 110. Base Transceiving Stations 112, 114 may also provide a networking component of a mobile communications system from which all signals are sent and received. Base Transceiving Stations 112, 114 may be controlled and monitored by Base Station Controller 116.

In turn, Base Station Controller 116 may be controlled via Mobile Switching Center/Visitor Location Register 118. In one embodiment, additional Mobile Switching Centers/Visitor Location Registers, e.g., Mobile Switching Center/Visitor Location Register 122, may also be provided. Mobile Switching Center 118 may include a switching node that assumes the technical functions of a landline network switching node, for example, path search, signal path switching, and/or processing of supplementary services. Additionally, if there is a requirement for a connection to a subscriber in a landline network, the request may be forwarded by Mobile Switching Center 118 to the landline network over a switching path. Other various implementations may also be provided.

In order for a network system 100 to provide various services to its subscribers, Mobile Switching Center 118 may also access a variety of databases. In one embodiment, Mobile Switching Center 118 may connect to a subscriber database, such as a Home Location Register 132, which may store information that identifies subscribers using its network and which services they use. This information may be stored in a Home Location Register 132 as data including a subscriber's customer number, services, and/or other identifiers. Other various storage data and formats may also be provided.

In another embodiment of the present invention, Mobile Switching Center 118 may access information from Visitor Location Register 118. In order to establish a landline network connection to a mobile device, for example, the network provider may need to know where the subscriber is physically located and whether his or her mobile device is switched on. This information may be stored in Visitor Location Register 118. In another embodiment, the information may be stored in a Home Location Register 132 or a combination of Visitor Location Register 118 and a Home Location Register 132.

In yet another embodiment of the present invention, Mobile Switching Center 118 may include network elements, such as software, to determine from the data in the Home Location Register 132, for example, whether a call is in-network or out-of-network. Determining this may include sending a verification request to the subscriber database and receiving a verification from the database. This process will be discussed in further detail below.

System 100 may also include Authentication Center 126, which may store algorithms, subscriber-related keys, and other similar data. In one embodiment, this information may be useful, for example, during an authentication or verification check where network system 100 may determine whether or not a subscriber is entitled to use the mobile telecommunication network. For example, the subscriber may take out a card contract or use a pre-paid mobile device, where the subscriber pre-pays the service provider for service rather than getting billed at the end of every billing cycle. In this instance, the Authentication Center 126, in conjunction with other network elements, may determine whether or not the funds in a pre-paid mobile device have run out. Other various embodiments may also be considered.

Equipment Identity Register 128 may comprise an optional database that may be maintained by system 100. Equipment Identity Register 128 may store data including details of mobile transceivers permitted on the network. In one embodiment, this information may be broken down into a plurality of groups, e.g., white, grey and black lists. The white list may include a register of all the mobile devices which are functioning reliably. The grey list may contain details about devices which may possibly be defective. The black list may hold details of devices which either have a fault or have been reported stolen.

While databases 126, 128, 132, 134 are shown as separate databases, it should be appreciated that the contents of these databases may be combined into fewer or greater numbers of databases and may be stored on one or more data storage systems and in more than one format.

System 100 may also include Gateway Mobile Switching Center 120. Gateway Mobile Switching Center 120 may provide an EDGE (Enhanced Data rates for GSM Evolution) function within a Public Land Mobile Network (PLMN) to terminate the Public Switched Telephone Network (PSTN) 124 signalling and traffic formats. EDGE may provide Enhanced General Packet Radio Service (EGPRS), which may be used for any packet switched applications such as an Internet connection. High-speed data applications such as video services and other multimedia may benefit from EGPRS' increased data capacity. EDGE may also serve as a bolt-on enhancement to General Packet Radio Service (GPRS) networks. The technology may function on any network with GPRS deployed on it, provided the carrier implements the necessary upgrades. In another embodiment, Gateway Mobile Switching Center 120 may convert this to a mobile networks protocol.

Network Identifier Alert Generator 130 may be connected to Mobile Switching Center/Visitor Location Register 118 and/or the databases 126, 128, 132, 134. Network Identifier Alert Generator 130 may receive and exchange data, e.g., a verification, with the Mobile Switching Center 118 or with the databases directly. Network Identifier Alert Generator 130 may also create and transmit messages based on data received from or exchanged with the Mobile Switching Center 118 and/or databases. In one embodiment, Network Identifier Alert Generator 130 may receive data from the Mobile Switching Center 118 and determine whether a potential call is in-network or out-of-network. This process will be discussed in further detail below.

Figure 2:
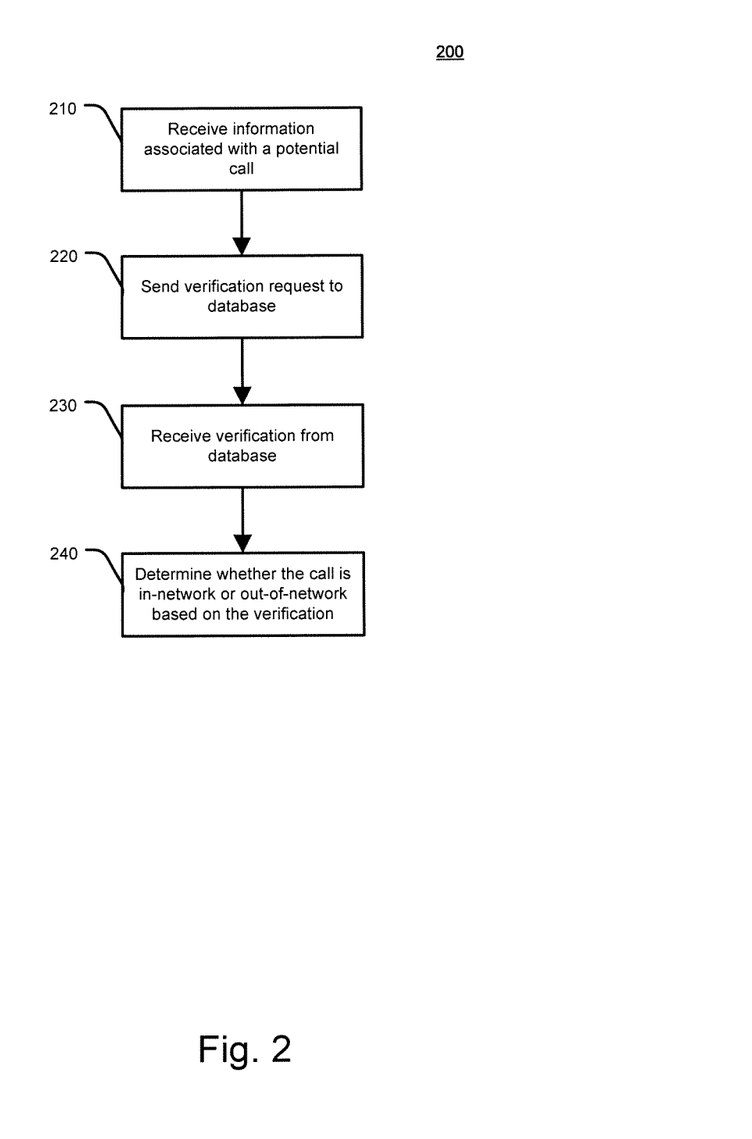
FIG. 2 depicts an exemplary flowchart illustrating a service provider awareness method, according to an embodiment of the disclosure.

FIG. 2 depicts an exemplary flowchart illustrating a service provider awareness method, according to an embodiment of the disclosure. In step 210, system 100 may identify a potential call between an originator and an intended recipient by receiving information associated with a potential call. In step 220, the Mobile Switching Center 118 may send a verification request to a subscriber database, e.g., Home Location Register 132, for data and/or information relating to the originator and the intended recipient. In step 230, the Mobile Switching Center 118 may receive a verification from the database. In step 240, the potential call may be identified as an in-network call or an out-of-network call. Also, an out-of-network call may be registered or stored in a visitor database, such as the VLR 118. In this example, the stored information may be later retrieved for a quick determination that the potential call is out-of-network for calls made to or from the same number.

In a preferred embodiment, a Mobile Switching Center 118 may include network elements, such as software, to determine whether a call is in-network or out-of-network based on the verification from the subscriber database. In another embodiment, the verification may be routed from the Mobile Switching Center 118 to a Network Identifier Alert Generator 130. In this example, the Network Identifier Alert Generator 130 may include network elements to determine whether a call is in-network or out-of-network.

A potential call between an originator and an intended recipient may be identified as an in-network call when data relating to both the originator and the intended recipient exists in the subscriber database or Home Location Register 132. A potential call may be identified as an out-of-network call when data relating at least one of the originator and the intended recipient does not exist in the subscriber database (e.g., Home Location Register 132). For example, when an individual subscribes with a wireless operator, he or she may be registered in the subscriber database of that operator. The subscriber database may be used for storage and management of subscriptions and may store data about subscribers of the service provider, such as a subscriber's service profile, location information, activity status, and other similar data. As a result, if data of an originator and data of an intended recipient exists in the Home Location Register 132, for example, they may both be identified as subscribers of the same network, and a potential call between them may be considered in-network. On the other hand, if either the data of an originator or the data of the intended recipient does not exist in the Home Location Register 132, they may be identified as being on different networks, and a potential call between them may be considered out-of-network. Other techniques and locations within the network for determining in-network and out-of-network calls may also be used.

Figure 3:
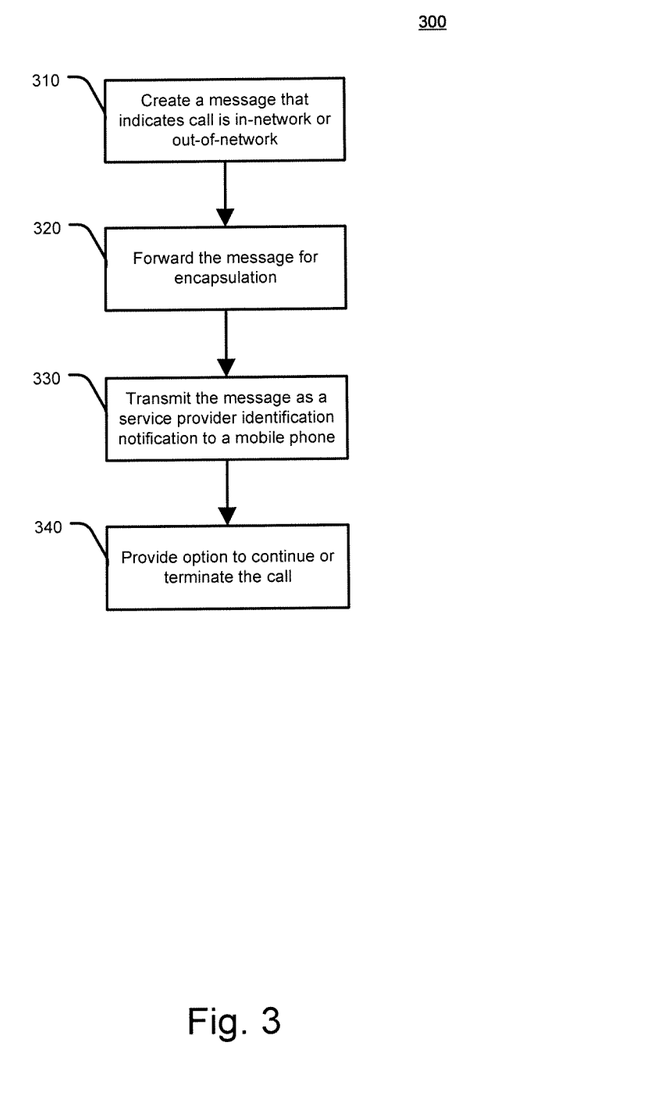
FIG. 3 depicts an exemplary flowchart illustrating a service provider awareness method, according to an embodiment of the disclosure.

FIG. 3 depicts an exemplary flowchart illustrating a service provider awareness feature, according to an embodiment of the disclosure. In this example, an originator of a potential call may be a subscriber. When the originator/subscriber makes a potential call to an intended recipient and the potential call is determined to either be in-network or out-of-network according to the steps discussed in FIG. 2, the Network Identifier Alert Generator 130 may create a short message (e.g., a text message or a SMS message) to indicate an in-network or out-of-network call, as depicted in step 310. For example, in one embodiment, when the originator makes a call and it is determined that the call is in-network, the Network Identifier Alert Generator 130 may create an "in-network" message. In another embodiment, when it is determined that the call made by the originator to the intended recipient is out-of-network, the Network Identifier Alert Generator 130 may create an "out-of-network" message. In addition to messages, other variations may also be provided, such as a small icon identifier, a ring tone pattern, a vibration pattern, etc. In each of these examples, one icon and/or pattern may indicate in-network and another icon/pattern may indicate out-of-network. Other various embodiments may also be provided.

In step 320, the Network Identifier Alert Generator 130 may forward the message to the MSC 118. The Mobile Switching Center 118 may process the message, for example, by encapsulating the message into a wireless air protocol. Encapsulating the message into a wireless air protocol may include formatting the message for a more rapid wireless transmission. Other various embodiments may also be provided. In step 330, the encapsulated message may then be transmitted as a service provider identification message to the mobile device 110 of the originator/subscriber of the potential call.

In a preferred embodiment, the originator/subscriber may be provided an option to continue the potential call or to terminate the potential call based on the service provider identification message, as depicted in step 340. This option may be provided at the mobile device 110 in a variety of ways, including an interactive menu, in which the subscriber may select a "continue" option to continue the call or the "terminate" option to not proceed with the call. Other various menu options may also be provided, such as a recorded voice menu, a distinctive ringing pattern/sequence, and other notification.

Figure 4:
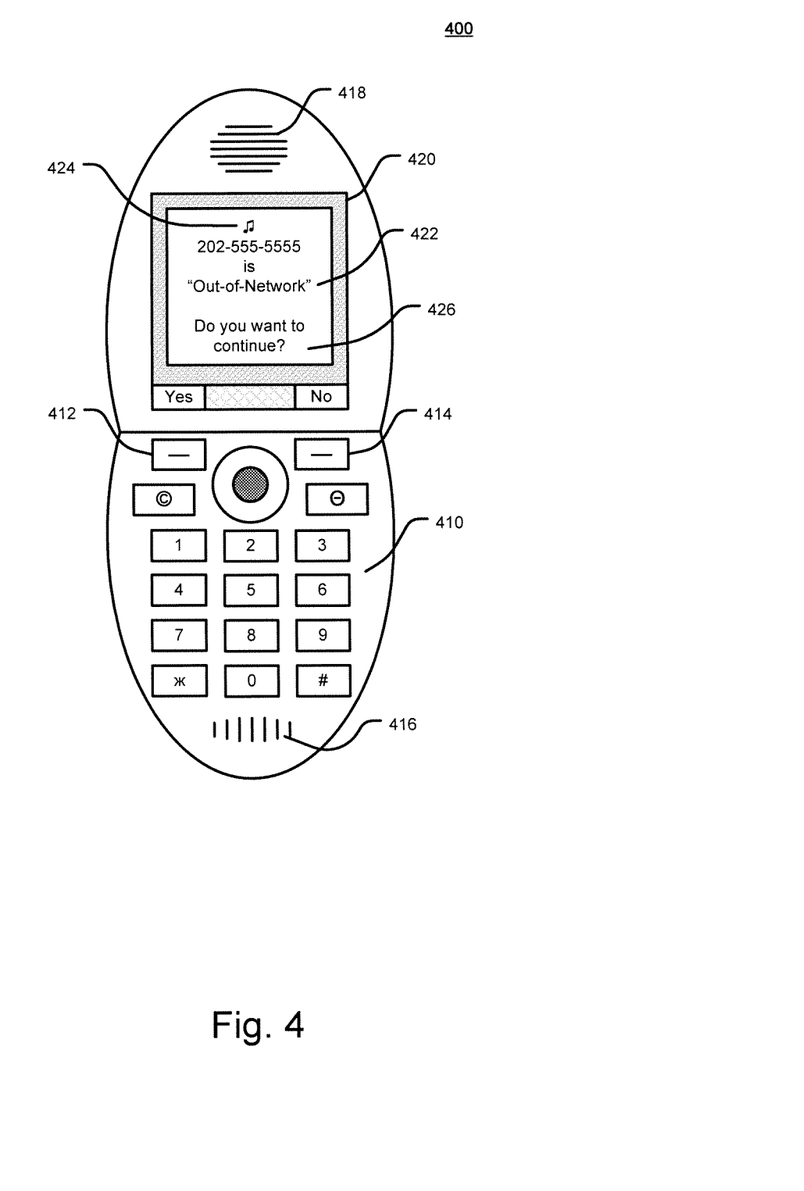
FIG. 4 depicts an exemplary mobile device illustrating a service provider identification method, according to an embodiment of the disclosure.

It should be appreciated that various forms of service provider identification may exist but one such illustrative example is depicted in FIG. 4. FIG. 4 depicts an exemplary mobile device 400 illustrating a service provider identification method, according to an embodiment of the disclosure. In this example, the originator/subscriber may place a call by entering a number, such as 202-555-5555 into the keypad 410. After dialing the number, the display screen 420 may display that the call is an "Out-of-Network" call 422. In one embodiment, this message 422 may be accompanied by a audible ring tone 424 or similar notification. The display screen may also display another message 426 asking the originator/subscriber whether he or she wishes to "continue" to the call. Two menu options may be provided—"Yes" or "No." If the originator wishes to continue the call, he or she may push a button 412 corresponding to the "Yes" option. The originator may place his or her ear at by the speaker 418 and speak at the input 416 to talk to the intended recipient at 202-555-5555. At this point, out-of-network minutes and/or charges may me applied to the subscriber for proceeding with this call. If the originator/subscriber wishes to end or terminate the call, he or she may push a button 414 corresponding to the "No" option. In this case, the subscriber may decide not to incur the charges that may accompany the out-of-network call.

Figure 5:
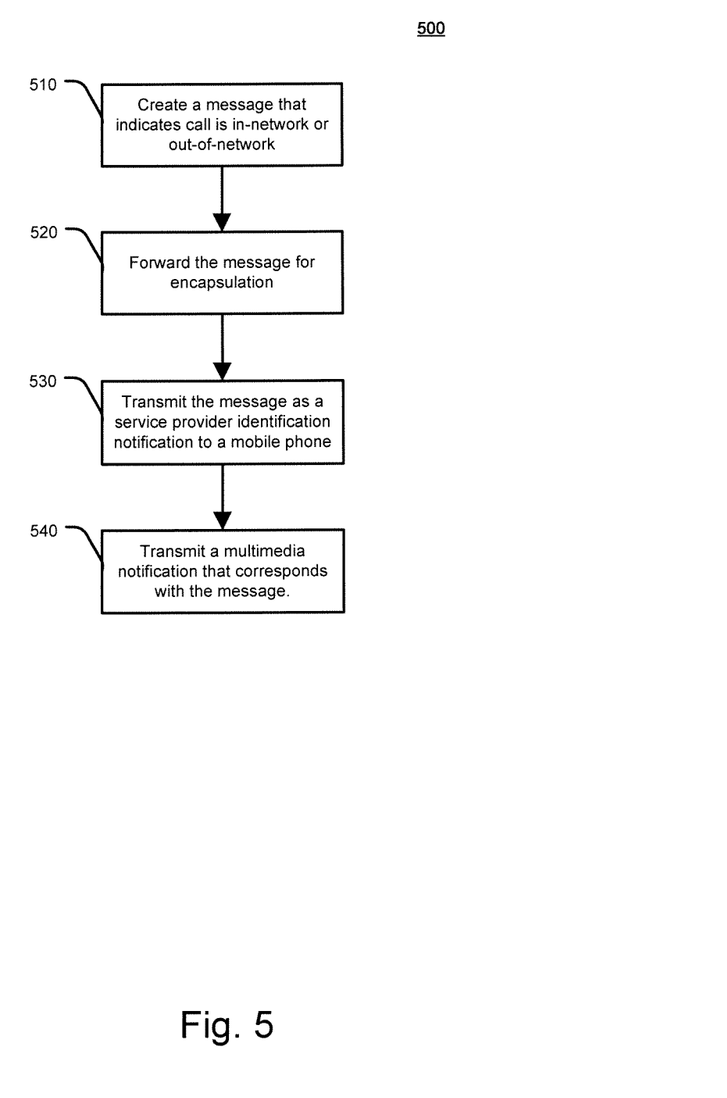
FIG. 5 depicts an exemplary flowchart illustrating a service provider awareness method, according to an embodiment of the disclosure.

FIG. 5 depicts an exemplary flowchart illustrating a service provider awareness feature, according to an embodiment of the disclosure. In this example, an intended recipient of a potential call may be a subscriber. When the intended recipient/subscriber receives a call from an originator and the call is determined to either be in-network or out-of-network according to the steps discussed in FIG. 2, the Network Identifier Alert Generator 130 may create a short message (e.g., a text message or a SMS message) to indicate an in-network call or an out-of-network call, as depicted in step 510. For example, in one embodiment, when the intended recipient receives a call and it is determined that the call is in-network, the Network Identifier Alert Generator 130 may create an "in-network" message. In another embodiment, when it is determined that the call made by the originator to the intended recipient is out-of-network, the Network Identifier Alert Generator 130 may create an "out-of-network" message. In addition to messages, other variations may also be provided, such as a small icon identifier, a ring tone pattern, a vibration pattern, etc. In each of these, one icon and/or pattern may indicate in-network and another icon/pattern may indicate out-of-network. Other various embodiments may also be provided.

In step 520, the Network Identifier Alert Generator 130 may forward the message to the MSC 118. The Mobile Switching Center 118 may process the message, for example, by encapsulating the message into a wireless air protocol. Encapsulating the message into a wireless air protocol may include formatting the message for a more rapid wireless transmission. Other alternatives may also be provided.

In step 530, the encapsulated message may then be transmitted as a service provider identification message to the mobile device 110 of the intended recipient/subscriber of the potential call. In one embodiment, a caller ID message may be sent along with the service provider notification message. In another embodiment, a multimedia notification may be transmitted along with and corresponding to the service provider notification message, as depicted in step 440. The multimedia notification may include an audio pattern, a vibration pattern, an image, a video, etc. Other various notifications may also be provided.

Figure 6A:
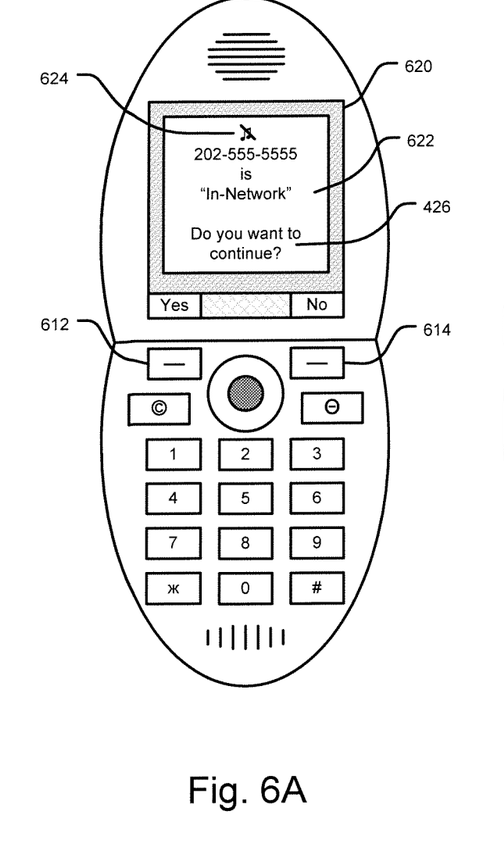
FIGS. 6A and 6B an exemplary mobile device illustrating a service provider identification method, according to an embodiment of the disclosure.
Figure 6B:
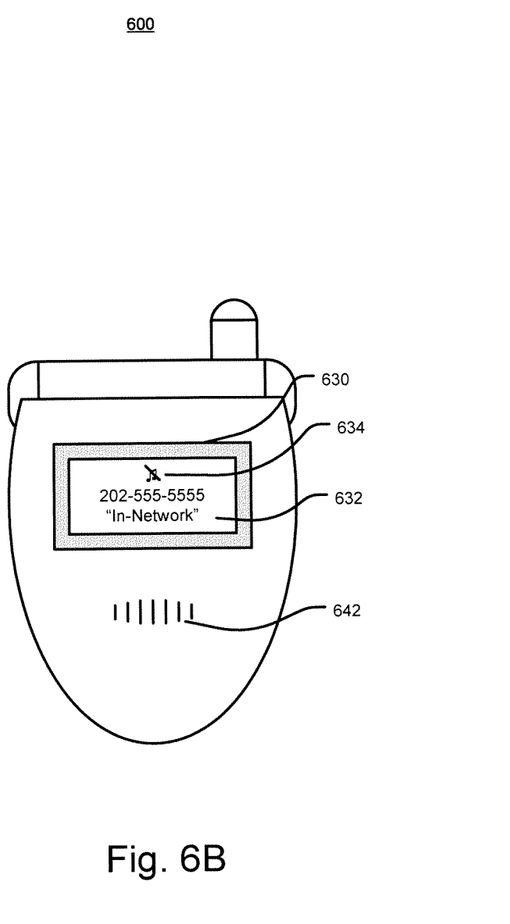

It should be appreciated that various forms of service provider identification may exist but one such illustrative example is depicted in FIGS. 6A and 6B. Since FIG. 6A is similar to FIG. 4, it should be understood in relation to FIG. 4 in that the placement and relationship between elements as described in relation to FIG. 4 should apply to FIG. 6A as well.

FIGS. 6A and 6B depicts an exemplary mobile device 600 illustrating a service provider identification method, according to an embodiment of the disclosure. In this example, the intended recipient/subscriber may receive a call from an originator at a number, such as 202-555-5555. If the mobile device is opened, the number may be displayed on an internal screen 620. If the mobile device is closed, the originator number may be displayed on an external display screen 630. The internal screen 620 and/or the external screen 630 may display that the call is "In-Network." In one embodiment, the service provider notification message 622, 632 may be accompanied by a audible ring tone similar to that depicted in FIG. 4. In the closed position, the audible ring may be outputted from an external speaker 642. In another embodiment, an audible notification may be disabled, as depicted in 624, 634. In this case, the mobile device 600 may notify the intended recipient/subscriber by another notification, e.g., a vibration pattern or visual/blinking display pattern. In one embodiment, the intended recipient/subscriber may see that the call is "In-Network" and simply flip open the device 600 to accept the call from the originator. In another embodiment, the display screen 620 may also display another message 626 asking the originator/subscriber whether he or she wishes to "continue" to the call when he or she flips open the phone. Similar to FIG. 4, two menu options may be provided—"Yes" or "No." If the intended recipient wishes to continue the call, he or she may push a button 612 corresponding to the "Yes" option. If the originator/subscriber wishes to end or terminate the call, he or she may push a button 614 corresponding to the "No" option. In this case, because the call is "In-Network," the intended recipient/subscriber may not incur any charges after accepting this call.

An advantage of a service provider feature, according to an embodiment of the present invention, may include significant flexibility for users/subscribers to manage their minute usage by choosing to limit time spent on out-of-network calls. For example, it may provide them the option to ignore or terminate an out-of-network call and return the call from a wireline phone or delay the call until night/weekends when all calls are free. Such a feature may also be provided to users/subscribers as an add-on feature with calling plans. It may also be used as promotional incentive for customers to choose a particular service provider. Additionally, the feature may open up potential partnership deals with other service providers to provide a similar feature over more than one network. For example, a first service provider and a second service provide may team up so that all calls between the first and second service provider are considered in-network.

It should be appreciated that a "potential call" from an originator to an intended recipient may become an activated call once at least one of the parties agrees to the terms of the call and accepts. For example, when an originator and/or the intended recipient receives a service provider identification at his or her device and presses "yes/continue" to answer the potential call, the potential call may then become a fully activated call at that point.

It should be appreciated that while embodiments of the disclosure are directed to provider identification in wireless and mobile devices, other implementations may be provided as well. For example, in Voice over IP (VoIP), subscribers of a particular network may call or receive calls free of charge while calls outside of a subscriber's network may incur charges. Thus, a service provider identification feature may be utilized in VoIP to provide similar functionalities and benefits as discussed above. Other various implementations may also be provided.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving, at a first network element, information associated with a potential call between an originator and an intended recipient;
   determining, at the first network element, whether the potential call is in-network or out-of-network; and
   notifying, by a second network element, at least one of the originator and the intended recipient that the potential call is in-network or out-of-network based on the determination at the first network element,
   wherein notifying the at least one of the originator and the intended recipient comprises transmitting a multimedia notification that includes a vibration pattern which indicates whether the potential call is in-network or out-of-network, the vibration pattern selected from a first vibration pattern indicating that the call is in-network and a second vibration pattern, different from the first vibration pattern, indicating that the call is out-of-network.

2. The method of claim 1, wherein determining whether the potential call is in-network or out-of-network comprises:
   sending a verification request to a database for data relating to the originator and the recipient; and
   receiving a verification request result from the database.

3. The method of claim 2, wherein receiving information associated with a potential call as in-network when the verification request result indicates that data relating to both the originator and the recipient exists in the database.

4. The method of claim 2, wherein receiving information associated with a potential call as out-of-network when the verification request result indicates that data relating to at least one of the originator and the recipient does not exist in the database.

5. The method of claim 1, wherein notifying further comprises:
   creating a message based on whether the potential call is in-network or out-of-network;
   encapsulating the message; and
   transmitting the message to a mobile device of at least one of the originator and the intended recipient.

6. The method of claim 5, wherein the message indicates to the mobile device of the originator that the potential call is in-network in the event that the data relating to both the originator and the intended recipient exist in the database.

7. The method of claim 5, wherein the message indicates to the mobile device of the originator that the potential call is out-of-network in the event that the data relating to the intended recipient does not exist in the database.

8. The method of claim 5, wherein the method further comprises providing an option to continue the potential call or to terminate the potential call after receiving the message at the mobile device.

9. The method of claim 5, wherein the message indicates to the mobile device of the intended recipient that the potential call is in-network in the event that the data relating to both the originator and the intended recipient exist in the database.

10. The method of claim 5, wherein the message indicates to the mobile device of the intended recipient that the potential call is out-of-network in the event that the data relating to the originator does not exist in the database.

11. The method of claim 10, wherein the method further comprises storing the data relating to the out-of-network call in a visitor database.

12. The method of claim 11, wherein determining whether the potential call is in-network or out-of-network comprises accessing the visitor database which stores the data relating to the out-of-network calls.

13. The method of claim 5, wherein the message is a text message.

14. The method of claim 5, wherein encapsulating the message comprises encapsulating the message for wireless transmission to the mobile device.

15. The method of claim 5, wherein transmitting the message further comprises transmitting a caller ID notification and the multimedia notification corresponds to the message, wherein the multimedia notification further includes at least one of an audio pattern, an image, and a video.

16. A non-transitory computer readable media comprising code executable by at least one computer processor to perform the acts of the method of claim 5.

17. The method of claim 1, further comprising retrieving from a database information indicating whether the originator of the call is using a device which has been reported stolen.

18. The method of claim 1, wherein the first network element and second network element are different network elements.

19. A system, comprising:
a first network element configured to receive information associated with a potential call between an originator and an intended recipient and determine whether the potential call is in-network or out-of-network; and
a second network element configured to notify at least one of the originator or the intended recipient, based on the determination at the first network element, by transmitting a message that includes a vibration pattern which indicates whether the potential call is in-network or out-of-network, the vibration pattern selected from a first vibration pattern indicating that the call is in-network and a second vibration pattern, different from the first vibration pattern, indicating that the call is out-of-network.

20. The system of claim 19, wherein the first network element receives information associated with a potential call as in-network when data relating to both the originator and the intended recipient exists in a database communicatively coupled to the first network element.

21. The system of claim 19, wherein the first network element receives information associated with a potential call as out-of-network when data relating to at least one of the originator and the intended recipient does not exist in a database communicatively coupled to the first network element.

22. The system of claim 19, wherein the second network element notifies at least one of the originator or the intended recipient by encapsulating the message, and transmitting the message to a mobile device.

23. A method, comprising:
receiving, at a network element, information on whether a potential call between an originator and an intended recipient is in-network or out-of-network;
creating, at the network element, a message based on the information; and
transmitting, from the network element, the message to a mobile device,
wherein the message includes a vibration pattern which indicates whether the potential call is in-network or out-of-network, the vibration pattern selected from a first vibration pattern indicating that the call is in-network and a second vibration pattern, different from the first vibration pattern, indicating that the call is out-of-network.

24. The method of claim 23, wherein the message indicates to the mobile device of a subscriber that the potential call is an in-network call when the information indicates the existence of data relating to both the originator and the intended recipient in a database, wherein the subscriber is either the originator or the intended recipient.

25. The method of claim 23, wherein the message indicates to the mobile device of a subscriber that the potential call is an out-of-network call when the information indicates the existence of either one of data relating the originator or the intended recipient in a database, wherein the subscriber is either the originator or the intended recipient.

26. The method of claim 23, wherein transmitting the message further comprises transmitting a caller ID notification and a multimedia notification that corresponds to the message, wherein the multimedia notification comprises at least one of an audio pattern, an image, and a video.

* * * * *